United States Patent [19]
Nakai

[11] Patent Number: 5,793,170
[45] Date of Patent: Aug. 11, 1998

[54] MOTOR DRIVE CIRCUIT

[75] Inventor: Tatsuji Nakai, Kyoto, Japan

[73] Assignee: Rohm Co., Ltd., Kyoto, Japan

[21] Appl. No.: 816,160

[22] Filed: Mar. 12, 1997

[30] Foreign Application Priority Data

Mar. 13, 1996 [JP] Japan .................................. 8-056249

[51] Int. Cl.$^6$ .................................................. H02K 23/00
[52] U.S. Cl. ........................ 318/254; 318/138; 318/439;
318/798; 318/799; 318/800; 318/801; 318/802;
318/803; 318/804; 318/805; 318/806; 318/807;
318/808; 318/809; 318/810; 318/811; 318/812;
318/813; 318/814; 318/815; 347/247
[58] Field of Search ............................ 318/138, 439,
318/254, 798–815; 347/247

[56] References Cited

U.S. PATENT DOCUMENTS

| | | | |
|---|---|---|---|
| 5,264,774 | 11/1993 | Ito | 318/254 |
| 5,523,660 | 6/1996 | Fujii | 318/254 |
| 5,659,230 | 8/1997 | Fukuoka | 318/254 |
| 5,677,723 | 10/1997 | Soya et al. | 318/254 X |

*Primary Examiner*—Karen Masih
*Attorney, Agent, or Firm*—Nikaido, Marmelstein, Murray & Oram LLP

[57] ABSTRACT

In a motor drive circuit, the collector-emitter paths of two npn-type transistors are connected in series between a power line and ground, and the junction between the two transistors is connected to a motor coil. A control circuit feeds a control current to the base of the transistor connected to the power line so that this transistor supplies a drive current to the motor coil. A current mirror circuit is provided which is constituted of two pnp-type transistors whose emitters are connected to the power line, and the base and collector of the input-side transistor is connected to the control circuit through a diode. The base of another pnp-type transistor is connected to the cathode of the diode, and the emitter of this transistor is connected to the collector of the output-side transistor of the current mirror circuit and to the base of the transistor connected to the power line.

5 Claims, 4 Drawing Sheets

MOTOR DRIVE CIRCUIT

BACKGROUND OF THE INVENTION

1. Field of the Invention

The present invention relates to a motor drive circuit.

2. Description of the Prior Art

Conventionally, a three-phase brushless motor is driven by the use of a drive circuit as shown in FIG. 1. Specifically, in this circuit, a control circuit 60 outputs a pair of control signals for each phase, and these control signals drive control transistors (output transistors) T1 to T6 to supply drive currents to motor coils $L_1$, $L_2$, and $L_3$.

This circuit has one pair of transistors for each phase, and, of these transistors, the transistors T1, T3, and T5 supply currents to the coils when they are turned on, whereas the transistors T2, T4, and T6 take in currents from the coils and pass the currents to ground when they are turned on. Accordingly, two transistors constituting a pair, e.g. T1 and T2, are never turned on at the same time.

In FIG. 1, A1, A2, and A3 represent terminals connected to the motor coils $L_1$, $L_2$, and $L_3$. Numeral 61 represents a power line having a voltage of $V_m$. D1, D2, and D3 represent diodes constituting an OR circuit. Numeral 62 represents an amplifier for preventing saturation of the transistors T1, T3, and T5. To the inverting terminal (−) of the amplifier 62, the diodes D1, D2, and D3 are connected. To the non-inverting terminal (+) of the amplifier 62, a voltage of $V_m - V_1$ is applied. This voltage determines the saturation prevention level.

The output of the amplifier 62 is fed back to the control circuit 60 so that the outputs of the control circuit 60 do not cause saturation of the transistors. Specifically, the amplifier 62 compares the collector-emitter voltage $V_{CE}$ of the transistors T1, T3, and T5 with the saturation prevention level V1, and performs necessary operations to maintain $V_{CE}$ above V1. Driving the transistors T1 to T6 in a saturated state leads to degrada- tion of linearity and thus to unstable rotation of the motor, causing the motor to make intolerable noises as it rotates. This is the reason why a saturation prevention circuit is required. Note that, in FIG. 1, only the saturation prevention circuits for the transistors T1, T3, and T5 are shown.

However, in this conventional motor drive circuit, saturation of the output transistors is prevented by forcibly fixing the collector-emitter voltage $V_{CE}$ of the output transistors T1, T3 and T5 by the use of the voltage $V_1$, and therefore it is necessary to take into consideration variations in the charac- teristics of the output transistors. This means that the saturation prevention level V1 needs to be set to such a voltage that allows for an ample margin. As a result, it is not possible to set $V_{CE}$ to a small enough voltage, and this leads to an increase in ineffective voltage and thus to a reduction in torque.

SUMMARY OF THE INVENTION

An object of the present invention is to provide a motor drive circuit that, despite being of a saturation preventing type, yields improved driving torque as a result of sufficient suppression of ineffective voltage due to variations in the characteristics of the output transistors.

To achieve the above object, according to the present invention, a motor drive circuit is provided with five transistors, a current mirror circuit, a diode circuit, a con- necting device and a control circuit. The first npn-type transistor has a collector connected to a power line and an emitter connected to a motor coil the second npn-type transistor has a collector connected to the emitter of the first transistor and an emitter connected to ground. The current mirror circuit includes the third and fourth pnp-type tran- sistors having their emitter connected to the power line; The diode circuit includes a diode having an anode is connected to a base and a collector of the third transistor, which constitutes an input stage of the current mirror circuit, The fifth pnp-type transistor has a base connected to a cathode of the diode, The connecting device is for connecting a col- lector of the fourth transistor, which constitutes an output stage of the current mirror circuit, to an emitter of the fifth transistor and to the base of the first transistor, The control circuit is connected to the cathode of the diode and to the base of the fifth transistor. The control circuit outputs a current for controlling a motor, When the fifth transistor is turned on, the control circuit takes in a collector current of the fifth transistor to keep the fifth transistor in a stable state as long as the fifth transistor is on.

BRIEF DESCRIPTION OF THE DRAWINGS

This and other objects and features of this invention will become clear from the following description, taken in con- junction with the preferred embodiments with reference to the accompanied drawings in which.

DESCRIPTION OF THE PREFERRED EMBODIMENTS

Figure 1:
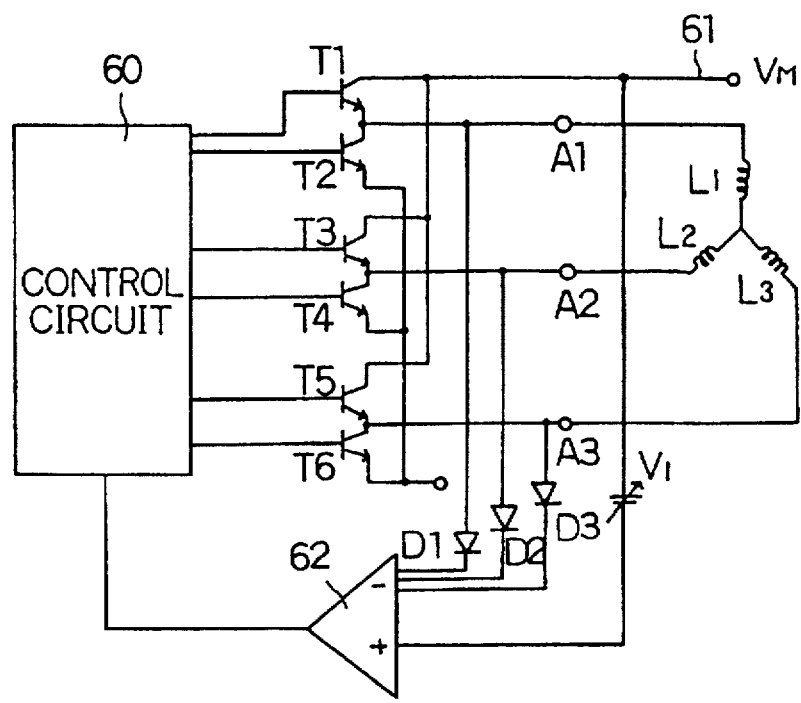
FIG. 1 is a circuit diagram of a conventional motor drive circuit.
Figure 2:
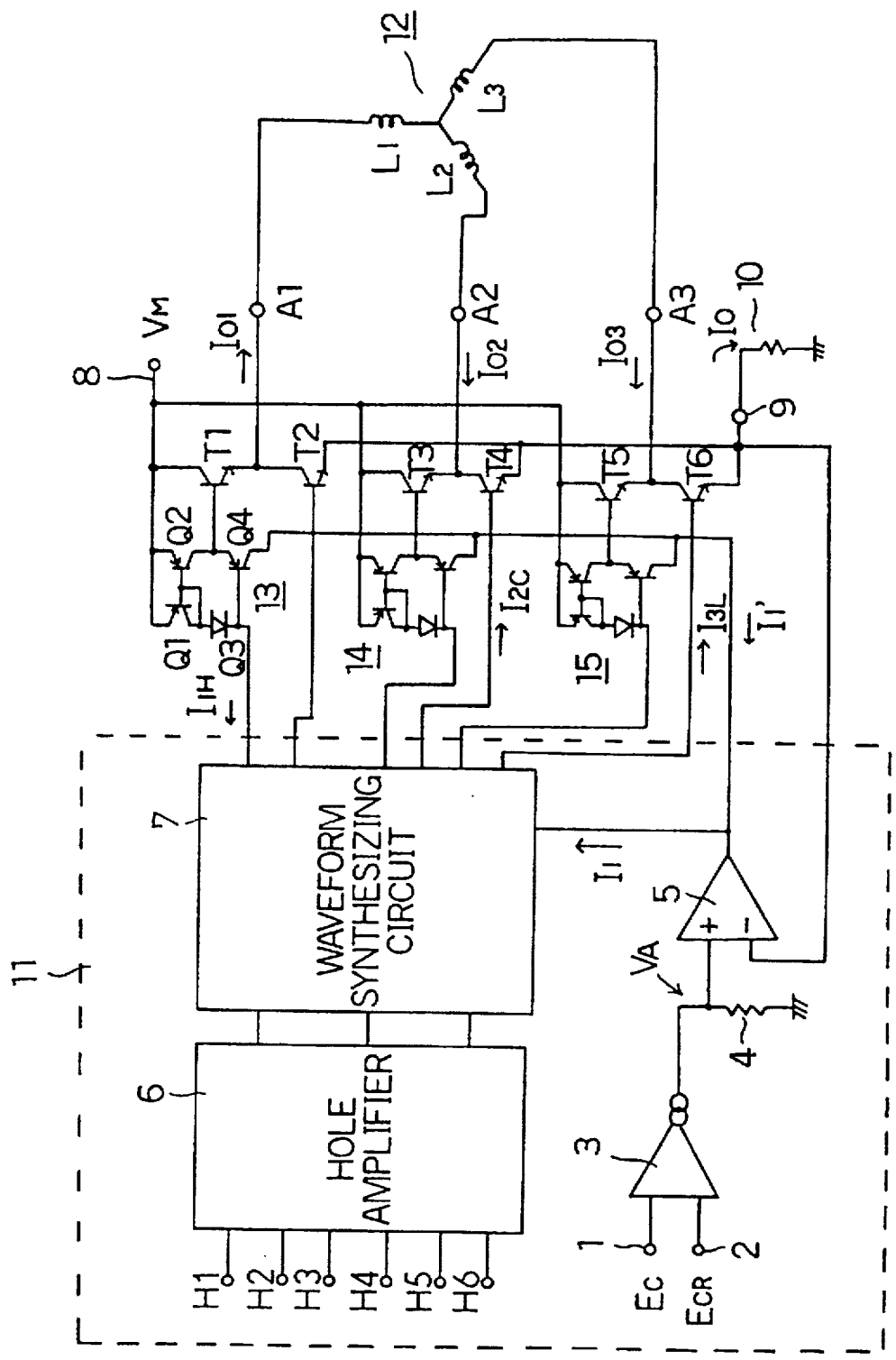
FIG. 2 is a circuit diagram of a first embodiment of the motor drive circuit according to the present invention.

Hereinafter, embodiments of the present invention will be described with reference to the drawings. FIG. 2 is a circuit diagram of a first embodiment of the motor drive circuit according to the present invention. In FIG. 2, numeral 11 represents a control circuit, numeral 1 represents an input terminal to which a torque setting voltage $E_c$ is supplied, numeral 2 represents an input terminal to which a torque setting reference voltage $E_{CR}$ is supplied, and numeral 3 represents a control amplifier that outputs a current in accordance with the difference in voltage between $E_c$ and $E_{CR}$. The output current from the control amplifier 3 flows through a resistor 4 to ground, and thereby causes a voltage $V_A$ to occur across the resistor 4. This voltage $V_A$ is fed to a current feedback amplifier 5.

The inverting terminal (−) of the current feedback ampli- fier 5 receives a feedback current, of which a description will be given later. The output current from the current feedback amplifier 5 is fed to a waveform synthesizing circuit 7. The signals obtained by position sensors (hole devices) that are provided, one for each phase, in a three-phase brushless motor 12 are fed to a hole amplifier 6 via hole input terminals H1 to H6. The outputs from the hole amplifier 6 are synthesized with the current $I_1$ by the waveform synthesizing circuit 7 to produce drive control currents, which are fed to output circuits 13, 14, and 15 that are provided, one for each phase, for motor coils $L_1$, $L_2$, and $L_3$.

The construction and operation of the output circuits 13, 14, and 15 are as follows. Note that, in the following description, only the output circuit 13 will be dealt with, since the output circuits 13, 14, and 15 have the same construction. To a power line 8, a current mirror circuit is connected which is constituted of pnp-type transistors Q1 and Q2. The base and the collector of the input-side transistor Q1 of the current mirror circuit is connected to the anode of ac diode Q3, and the cathode of this diode Q3 is connected to the waveform synthesizing circuit 7. In an IC (integrated circuit), this diode Q3 may be formed as a transistor of which a base and a collector are directly connected to each other.

To the cathode of the diode Q3, the base of a pnp-type transistor Q4 is connected. The emitter of this transistor Q4 is connected to the collector of the output-part transistor Q2 of the current mirror circuit, and the junction between these transistors Q2 and Q4 is connected to the base of an output transistor T1, which is one (the upper one in FIG. 2) of a pair of drive transistors T1 and T2.

The collector of the transistor Q4 is connected to the waveform synthesizing circuit 7 and to the current feedback amplifier 5 as shown in FIG. 2, so that the collector current of the transistor Q4 is superimposed on the output current from the current feedback amplifier 5 and is fed back to the waveform synthesizing circuit 7.

The base of the other output transistor T2 (the lower one in FIG. 2) is driven by the output current from the waveform synthesizing circuit 7. The emitter of this output transistor T2 is connected via a terminal 9 to a resistor 10, which is provided outside the motor drive IC. The voltage occurring across this resistor 10 is applied to the inverting terminal (−) of the current feedback amplifier 5. The current flowing through the motor coil is determined by the torque setting voltage $E_c$, and this current is kept constant by the circuit constituted of the current feedback circuit 5 and the resistor 10.

FIG. 2 shows a state in which the transistors T1, T4, and T6 are on. In this state, the current $I_{01}$ outputted from the emitter of the transistor T1 first flows via a terminal $A_1$ through the coil $L_1$, and then divides into two currents, that is, a current $I_{02}$ that flows through the coil $L_2$ to a terminal $A_2$ and a current $I_{03}$ that flows through the coil $L_3$ to a terminal $A_3$. Thereafter, the current $I_{02}$ flows through the transistor T4 into the resistor 10, and the current $I_{03}$ flows through the transistor T6 into the resistor 10. Accordingly, the current $I_0$ that flows through the resistor 10 is a sum of the currents $I_{02}$ and $I_{03}$.

From this state, if the current $I_{01}$ increases and thus the voltage at the terminal A, rises, the collector-emitter voltage $V_{CE}$ of the transistor T1 drops. If this goes too far, the transistor T1 becomes saturated. However, in the motor drive circuit according to the present invention, the base current of the transistor T1 is in such a case decreased to prevent saturation of the transistor T1. Now, suppose that the potential at the terminal $A_1$ is about to exceed $V_M - 2V_F$. Here, $V_M$ represents the voltage of the power line 8, and $V_F$ represents the base-emitter conducting voltage of the transistor T1.

When the voltage at the terminal $A_1$ reaches $V_M - 2V_F$, the base potential of the transistor T1 is higher by $V_F$ than its emitter potential, and therefore it equals $V_M - V_F$. On the other hand, the cathode potential of the diode Q3 is lower by $2V_F$ than $V_M$, and therefore it equals $V_M - 2V_F$. Accordingly, a voltage of $V_F$ is applied between the emitter and base of the transistor Q4. This causes the transistor Q4 to be turned on, and consequently the base current of the transistor T1 decreases.

As the base current of the transistor T1 decreases, its $V_{CE}$ drops accordingly. As a result, the transistor T1 now operates in a linear region corresponding to a new, lower $V_{CE}'$. To sum up, if no measures are taken to prevent saturation, the transistor T1 operates with a higher $V_{CE}''$ (higher than $V_{CE}'$), and thus a rise in its emitter potential inevitably leads to saturation of the transistor T1; by contrast, if the base current of the transistor T1 is decreased, when necessary, so that its $V_{CE}$ drops to a lower $V_{CE}'$ (lower than $V_{CE}''$), it is possible to keep the transistor T1 operating in a linear region (even when its emitter potential rises).

The collector current $I_1'$ of the transistor Q4 is fed back to the base of the transistor Q4 through the waveform synthesizing circuit 7, so that the transistor Q4 is kept in a stable state as long as it is on. As a result, the emitter potential of the transistor T1 is maintained within $V_M - 2V_F$. When the torque setting voltage $E_c$ is varied in such a way that $I_{01}$ decreases, the emitter voltage of the transistor T1 drops below $V_M - 2V_F$. This causes the emitter-base path of the transistor Q4 to be cut off, and thus the transistor Q4 is turned off.

Figure 3:
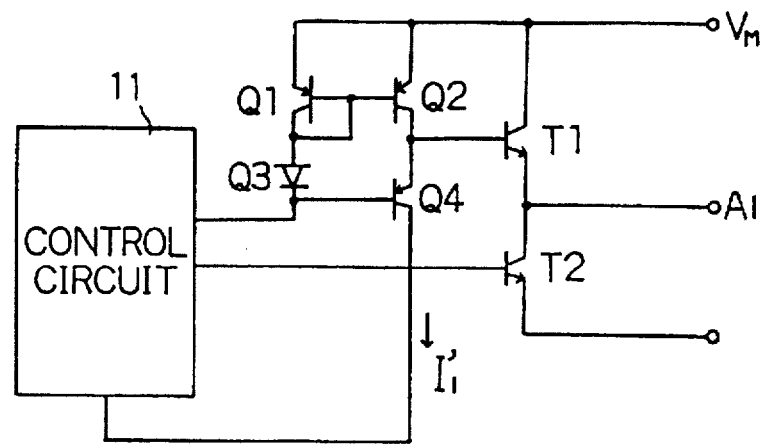
FIG. 3 is a circuit diagram of the output circuit of the first embodiment.
Figure 4:
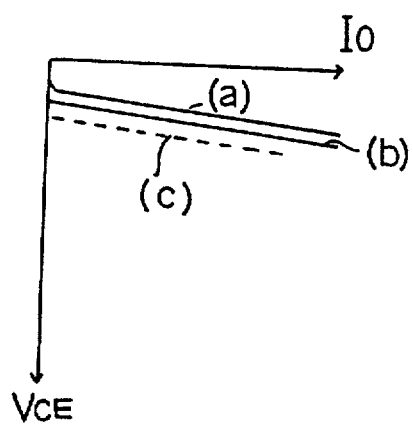
FIG. 4 is a chart showing the effect of the first embodi- ment.

FIG. 4 is a chart showing the effect of the motor drive circuit according to the present invention. In FIG. 4, the total current $I_o$ that flows through the motor coil is taken along the horizontal axis, and $V_{CE}$ of the transistor T1 is taken along the vertical axis. In FIG. 4, the graph (a) represents the operation characteristic of the transistor T1 itself, the graph (b) represents the saturation prevention characteristic (with respect to the transistor T1) of the first embodiment, and the graph (c) represents the corresponding saturation prevention characteristic of a conventional motor drive circuit. As seen from FIG. 4, according to the present invention, it is possible to make the saturation prevention characteristic (b) of the motor drive circuit sufficiently close to the characteristic (a) of the transistor itself, and therefore it is possible to reduce ineffective voltage accordingly and thus to drive a motor efficiently. FIG. 3 is a circuit diagram of the output circuit 13 of the first embodiment.

Figure 5:
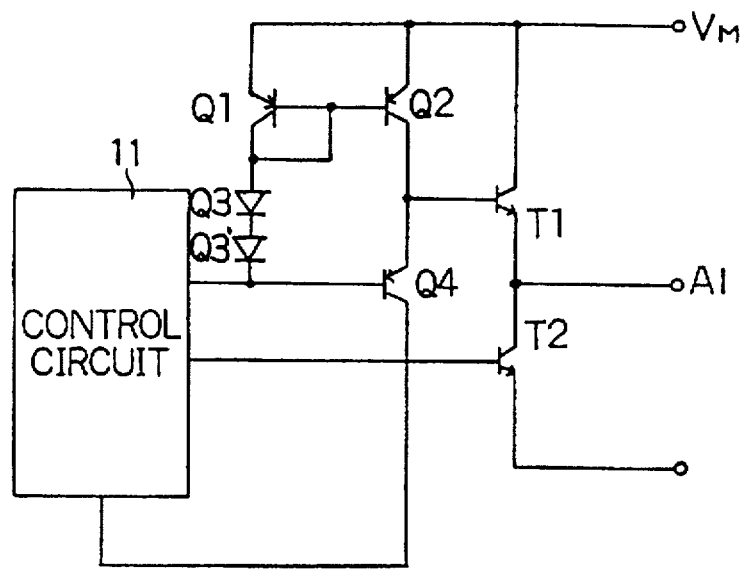
FIG. 5 is a circuit diagram of the output circuit of a second embodiment of the motor drive circuit according to the present invention.
Figure 6:
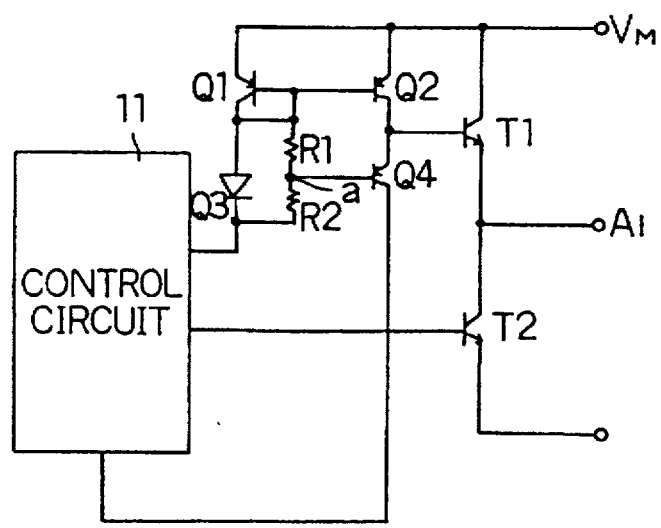
FIG. 6 is a circuit diagram of the output circuit of a third embodiment of the motor drive circuit according to the present invention.

FIG. 5 is a circuit diagram of the output circuit of a second embodiment of the motor drive circuit according to the present invention. This embodiment is different from the first embodiment shown in FIG. 3 only in that two diodes Q3 and Q3' are used as the diode circuit. FIG. 6 is a circuit diagram of the output circuit of a third embodiment of the motor drive circuit according to the present invention. This embodiment is different from the first embodiment shown in FIG. 3 only in that a voltage division circuit constituted of a pair of resistors R1 and R2 is connected in parallel with the diode 3, and that the transistor Q4 is connected to the voltage division junction a between these resistors. In FIG. 6, the diode Q3 may be constituted of a plurality of diodes as in FIG. 5.

In the second and third embodiments, the saturation prevention level is set to a different voltage from in the first embodiment; specifically, it is set to $V_M - 3V_F$ in the second embodiment, and to $V_M - V_F - V_F R_1/(R_1+R_2)$. Accordingly, of the three embodiments, the second embodiment (FIG. 5) uses the lowest saturation prevention level, the first embodiment (FIG. 3) uses an intermediate saturation prevention level, and the third embodiment (FIG. 6) uses the highest saturation prevention level.

In the above described embodiments, it is also possible to connect the collector of the transistor Q4 not to the control circuit 11 but, for example, to ground. However, if the collector of the transistor Q4 is connected to the control circuit 11 as in the above embodiments so that feedback is applied to the transistor Q4, the operation of the transistor Q4 in its on state is stabilized, and thus the operation of the motor drive circuit is stabilized. Specifically, in FIG. 3, as the collector current $I_1'$ of the transistor Q4 increases, the current outputted from the control circuit 11 decreases, and this prevents the collector current of the transistor Q4 from increasing. Such feedback serves to keep the transistor Q4 in a stable state as long as it is on.

As described above, according to the present invention, it is possible to make the saturation prevention characteristic of a motor drive circuit sufficiently close to the operation characteristic of its output transistor, and thus it is possible to increase torque. Moreover, according to the present invention, it is easy to set the saturation prevention level.

What is claimed is:

1. A motor drive circuit comprising:

a first npn-type transistor whose collector is connected to a power line and whose emitter is connected to a motor coil;

a second npn-type transistor whose collector is connected to the emitter of the first transistor and whose emitter is connected to ground;

a current mirror circuit comprising third and fourth pnp-type transistors whose emitters are connected to the power line;

a diode circuit comprising a diode whose anode is connected to a base and a collector of the third transistor, which constitutes an input stage of the current mirror circuit;

a fifth pnp-type transistor whose base is connected to a cathode of the diode;

means for connecting a collector of the fourth transistor, which constitutes an output stage of the current mirror circuit, to an emitter of the fifth transistor and to the base of the first transistor; and a control circuit connected to the cathode of the diode and to the base of the fifth transistor, wherein the control circuit outputs a current for controlling a motor, and, when the fifth transistor is turned on, the control circuit takes in a collector current of the fifth transistor to keep the fifth transistor in a stable state as long as the fifth transistor is on.

2. A motor drive circuit as claimed in claim 1, wherein said diode circuit is constituted of a plurality of diodes connected in series.

3. A motor drive circuit comprising:

a first npn-type transistor whose collector is connected to a power line and whose emitter is connected to a motor coil;

a second npn-type transistor whose collector is connected to the emitter of the first transistor and whose emitter is connected to ground;

a current mirror circuit comprising third and fourth pnp-type transistors whose emitters are connected to the power line;

a diode circuit comprising a diode whose anode is connected to a base and a collector of the third transistor, which constitutes an input stage of the current mirror circuit;

a resistor voltage division circuit connected in parallel with the diode circuit;

a fifth pnp-type transistor whose base is connected to a voltage division junction of the resistor voltage division circuit;

means for connecting a collector of the fourth transistor, which constitutes an output stage of the current mirror circuit, to an emitter of the fifth transistor and to the base of the first transistor; and a control circuit connected to the cathode of the diode, wherein the control circuit outputs a current for controlling a motor, and, when the fifth transistor is turned on, the control circuit takes in a collector current of the fifth transistor to achieve a feedback for the fifth transistor.

4. A motor drive circuit comprising:

a first npn-type transistor whose collector is connected to a power line and whose emitter is connected to a motor coil;

a second npn-type transistor whose collector is connected to the emitter of the first transistor and whose emitter is connected to ground;

a current mirror circuit comprising third and fourth pnp-type transistors whose emitters are connected to the power line;

a diode circuit comprising a diode whose anode is connected to a base and a collector of the third transistor, which constitutes an input stage of the current mirror circuit;

a fifth pnp-type transistor whose base is connected to a cathode of the diode;

means for connecting a collector of the fourth transistor, which constitutes an output stage of the current mirror circuit, to an emitter of the fifth transistor and to the base of the first transistor; and a control circuit whose output is coupled to the cathode of the diode and to the base of the fifth transistor, wherein the control circuit outputs a current for controlling a motor.

5. A motor drive circuit as claimed in claim 4, wherein said diode circuit is constituted of a plurality of diodes connected in series.

* * * * *